US010228797B2

(12) United States Patent
Roberson et al.

(10) Patent No.: US 10,228,797 B2
(45) Date of Patent: Mar. 12, 2019

(54) CONTINUOUS TIME ANTI-ALIAS FILTER FOR CAPACITIVE TOUCH SENSING

(71) Applicant: SYNAPTICS INCORPORATED, San Jose, CA (US)

(72) Inventors: Jeremy Roberson, San Jose, CA (US); David Sobel, Los Altos, CA (US); Farzaneh Shahrokhi, Boston, MA (US); Adam Schwartz, Redwood City, CA (US); Eric Scott Bohannon, Henrietta, NY (US)

(73) Assignee: SYNAPTICS INCORPORATED, San Jose, CA (US)

( * ) Notice: Subject to any disclaimer, the term of this patent is extended or adjusted under 35 U.S.C. 154(b) by 59 days.

(21) Appl. No.: 15/265,465

(22) Filed: Sep. 14, 2016

(65) Prior Publication Data

US 2017/0075495 A1 Mar. 16, 2017

Related U.S. Application Data

(60) Provisional application No. 62/218,382, filed on Sep. 14, 2015.

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 2203/04108* (2013.01)

(58) Field of Classification Search
None
See application file for complete search history.

(56) References Cited

U.S. PATENT DOCUMENTS

| 5,412,335 A | 5/1995 | Jackson et al. |
| 6,201,438 B1 | 3/2001 | Nicollini et al. |
| 6,529,068 B1 | 3/2003 | Nicollini et al. |
| 7,400,285 B2 | 7/2008 | Nicollini et al. |
| 8,031,094 B2 | 10/2011 | Hotelling et al. |
| 8,044,718 B2 | 10/2011 | Nicollini et al. |
| 8,045,943 B2 | 10/2011 | Kaczman et al. |

(Continued)

FOREIGN PATENT DOCUMENTS

WO    WO-2010111668 A1    9/2010

OTHER PUBLICATIONS

PCT/2016/051725, International Search Report and Written Report dated Dec. 13, 2016, Consists of 14 pages.

(Continued)

*Primary Examiner* — Nicholas J Lee
(74) *Attorney, Agent, or Firm* — Patterson + Sheridan, LLP (57) ABSTRACT

Embodiments described herein include an input device with a plurality of capacitive sensor electrodes configured to receive a signal. The input device also includes a processing system coupled to the plurality of capacitive sensor electrodes. The processing system includes an analog front end (AFE). The AFE includes an anti-aliasing filter comprising a continuous time analog infinite impulse response (IIR) filter configured to filter out interference from the received signal at frequencies higher than a signal frequency of the processing system to produce an anti-aliased signal. The AFE also includes a charge integrator configured to integrate the anti-aliased signal.

17 Claims, 8 Drawing Sheets

(56) References Cited

U.S. PATENT DOCUMENTS

| | | | |
|---|---|---|---|
| 8,279,180 B2 | 10/2012 | Hotelling et al. | |
| 8,391,628 B2 | 3/2013 | Huang et al. | |
| 8,928,407 B2 | 1/2015 | Miller et al. | |
| 8,988,384 B2 | 3/2015 | Krah et al. | |
| 9,058,078 B2 | 6/2015 | Weaver et al. | |
| 9,098,286 B2 | 8/2015 | Krah et al. | |
| 9,104,267 B2 | 8/2015 | Choi et al. | |
| 2010/0110040 A1* | 5/2010 | Kim | G06F 3/0412 345/174 |
| 2011/0063154 A1* | 3/2011 | Hotelling | H03M 3/494 341/143 |
| 2011/0242048 A1 | 10/2011 | Guedon et al. | |
| 2012/0268397 A1 | 10/2012 | Lee et al. | |
| 2013/0176272 A1 | 7/2013 | Cattivelli et al. | |
| 2013/0176273 A1 | 7/2013 | Li et al. | |
| 2013/0222290 A1 | 8/2013 | Choi et al. | |
| 2013/0257795 A1 | 10/2013 | Yilmaz et al. | |
| 2014/0210785 A1 | 7/2014 | King-Smith et al. | |
| 2015/0049060 A1* | 2/2015 | Bell | H03K 17/955 345/174 |

OTHER PUBLICATIONS

Sedra, Ghorab, and Martin, "Optimum Configurations for Single-Amplifier Biquadratic Filters", IEEE Transactions on Circuits and Systems, vol. CAS-27, No. 12, Dec. 1980.

Philip Geffe, "How to build high-quality filters out of low-quality parts", Electronics, Nov. 11, 1976.

Chandra et al., "Single-Amplifier Bi-Quadratic Filter Topologies in Transimpedance Configuration", IEEE Transactions on Circuits and Systems, vol. 55, No. 6, Jun. 2008, consists of 5 pages.

P.V. Ananda Mohan, "On Single Amplifier Bi-quadratic Topologies in Transimpedance Configuration", IEEE 2009, consists of 6 pages.

Carlosena et al., "Current-Mode Feedback Filters" IEEE Transactions on Circuits and Systems, vol. 40, No. 2, Feb. 1993, consists of 3 pages.

International Search Report and Written Opinion Application No. PCT/US2016/051725 dated Mar. 29, 2018 consists of 11 pages.

\* cited by examiner

CONTINUOUS TIME ANTI-ALIAS FILTER FOR CAPACITIVE TOUCH SENSING

CROSS-REFERENCE TO RELATED APPLICATIONS

This applications claims benefit of U.S. Provisional Patent Application Ser. No. 62/218,382, filed Sep. 14, 2015, which is incorporated by reference in its entirety.

BACKGROUND

Field of the Disclosure

Embodiments of the present invention generally relate to a method and apparatus for capacitive touch sensing, and more specifically, to filtering a received signal.

Description of the Related Art

Input devices including capacitive touch sensing devices (also commonly called touchpads, touchscreens, or touch sensor devices) are widely used in a variety of electronic systems. Capacitive touch sensing devices may be used to provide a graphical user interface (GUI) for an electronic system. For example, capacitive touch sensing devices are often used as input devices for larger computing systems (such as opaque touchpads integrated in, or peripheral to, notebook or desktop computers). Capacitive touch sensing devices are also often used in smaller computing systems (such as touch screens integrated in mobile phones).

A capacitive touch sensing device typically includes a sensing region, often demarked by a surface, in which the capacitive touch sensing device determines the presence, location and/or motion of one or more input objects. Inherently, the sensing region must be exposed to touch, which exposes it to external interference, which is large compared to the sensitive measurements of capacitive touch. Therefore, signal conditioning such as filtering is very important to the quality of the measurements. External interference may extend to arbitrarily high frequencies, which may be above the Nyquist limit which is set by the sampling rate of discrete-time components such as an analog-to-digital (ADC) converter, resulting in aliasing. What is needed is at least some continuous-time analog anti-alias filtering applied ahead of any sampling, to remove interference frequencies that would alias, preferably without using large component values.

SUMMARY

Embodiments described herein include a processing system for filtering a received signal from a capacitive touch sensor device, the processing system including an anti-aliasing filter comprising a continuous time infinite impulse response (IIR) filter configured to filter out interference from the received signal at frequencies higher than a signal frequency of the processing system to produce an anti-aliased signal. The processing system also includes a charge integrator configured to integrate the anti-aliased signal.

In another embodiment, an input device includes a plurality of capacitive sensor electrodes configured to receive a signal. The input device also includes a processing system coupled to the plurality of capacitive sensor electrodes. The processing system includes an analog front end (AFE). The AFE includes an anti-aliasing filter comprising a continuous time analog infinite impulse response (IIR) filter configured to filter out interference from the received signal at frequencies higher than a signal frequency of the processing system to produce an anti-aliased signal. The AFE also includes a charge integrator configured to integrate the anti-aliased signal.

In another embodiment, a method for sensing an input device includes receiving a signal with a capacitive sensor electrode. The method also includes filtering the received signal with an anti-aliasing filter to produce an anti-aliased signal, the anti-aliasing filter comprising a continuous time analog infinite impulse response (IIR) filter. The method further includes integrating the anti-aliased signal with a charge integrator.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation, where like designations may denote like elements. The drawings referred to here should not be understood as being drawn to scale unless specifically noted. Also, the drawings are often simplified and details or components omitted for clarity of presentation and explanation. The drawings and discussion serve to explain principles discussed below.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Interference in signals can be capacitively coupled into a touch sensing system, and the interference degrades the ability of the system to sense proximity, touch, stylus (pen), or other input objects. Interference can result from external interference sources (such as power supplies or displays)

and/or internal chip noise sources. Traditional systems integrate an input signal over a period of time, then sample the signal and perform processing in discrete time. Interference that is at a higher frequency than the Nyquist rate will alias and degrade the signal quality in a way that cannot be removed by discrete-time signal processing of the aliased interference.

Various embodiments of the present technology provide methods, circuits, and systems for improving usability of capacitive touch sensing devices. To reduce aliasing, embodiments described herein provide continuous time analog filtering before integrating and sampling the input signal. Particularly, embodiments described herein advantageously provide a continuous time analog anti-alias filter added to a charge integrator in an analog front end (AFE) of a touch sensing device to improve the signal-to-interference ratio (SIR). The anti-aliasing filter improves the SIR by attenuating high frequency interference content by more than the signal. High frequency filtering can be effective for dealing with display noise, which often has content above 1 MHz (MegaHertz). In some embodiments, the anti-aliasing filter could comprise a bandpass filter that also provides interference rejection of lower frequencies, such as power supply noise, in addition to rejecting higher frequencies.

Figure 1:
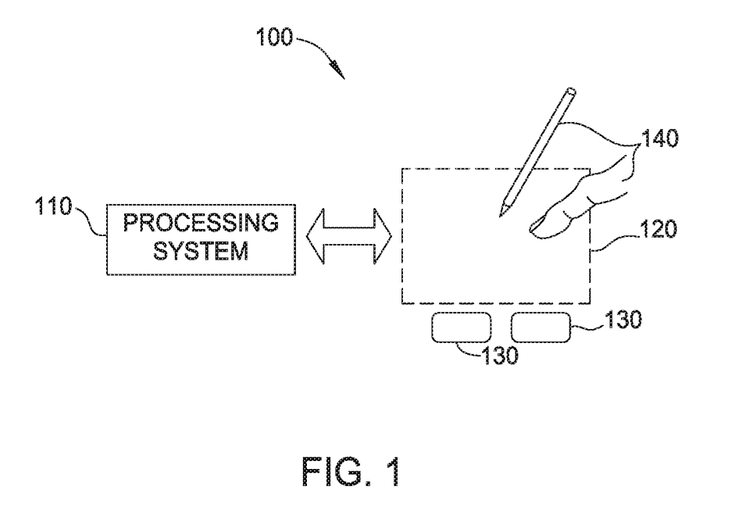
FIG. 1 is a block diagram of an input device according to an embodiment.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, workstations, laptop computers, netbook computers, tablets, ultrabooks, convertibles, web browsers, Internet appliances, e-book readers, and personal digital assistants (PDAs). Additional example electronic systems include composite input devices, such as physical keyboards that include input device 100 and separate isometric joysticks, buttons, or key switches. Further example electronic systems include peripherals such as data input devices (including remote controls and mice), and data output devices (including display screens, copiers, and printers). Other examples include remote terminals, kiosks, ATMs, point-of-sale terminals (i.e., cash registers), and video game machines (e.g., video game consoles, portable gaming devices, and the like). Other examples include communication devices (including mobile phones, such as smart phones), and media devices (including recorders, editors, and players such as televisions, set-top boxes, music players, digital photo frames, and digital cameras).

The input device 100 can be implemented as a physical part of the electronic system or can be physically separate from the electronic system. Additionally, the electronic system could be a host or a slave to the input device. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, Wi-Fi, and IRDA.

In FIG. 1, the input device 100 is shown as a capacitive sensor device (also often referred to as a "touchpad," "touchscreen," "capacitive touch sensing device," or a "touch sensor device") configured to sense user input provided by one or more input objects 140 in a sensing region 120. Example input objects 140 include fingers and styli, as shown in FIG. 1.

Sensing region 120 encompasses any space above, around, in, and/or near the input device 100 in which the input device 100 is able to detect user input (e.g., user input provided by one or more input objects 140). The sizes, shapes, and locations of particular sensing regions 120 may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100 (i.e., proximity to the input device 100), contact with an input surface (e.g., a touch surface) of the input device 100, contact with an input surface of the input device 100 coupled with some amount of applied force or pressure, contact through gloves, and/or a combination thereof.

The input device 100 comprises an input surface with one or more sensor electrodes for detecting user input. In various embodiments, input surfaces may be provided by surfaces of casings within which sensor electrodes reside, by face sheets applied over the sensor electrodes or any casings, etc. Some implementations may be configured to provide images that span one, two, three, or higher dimensional spaces. Some implementations may be configured to provide projections of the locations of input objects 140 along particular axes or planes. In some embodiments, the sensing region 120 has a rectangular shape, which may be projected onto an input surface of the input device 100.

The input device 100 may utilize any combination of sensor components and sensing technologies to detect user input in the sensing region 120. As a non-limiting example, the input device 100 may use capacitive techniques. In some capacitive implementations of the input device 100, voltage or charge is applied to sensor electrodes to create an electric field. Nearby input objects 140 cause changes in the electric field and produce detectable changes in capacitive coupling that may be detected as changes in voltage, current, charge, or the like.

Some capacitive implementations utilize "self capacitance" (or "absolute capacitance") sensing methods based on changes in the capacitive coupling between sensor electrodes and input objects 140. In various embodiments, an input object 140 near the sensor electrodes alters the electric field near the sensor electrodes, changing the measured capacitive coupling between the sensor electrodes and the input object 140. In one implementation, an absolute capacitance sensing method operates by modulating sensor electrodes with respect to a reference voltage (e.g., system ground) and by detecting changes in the capacitive coupling between the sensor electrodes and input objects 140. Sensor electrodes not being sensed may also be modulated with respect to the reference voltage, to act as guard electrodes.

Some capacitive implementations utilize "mutual capacitance" (or "transcapacitance") sensing methods based on changes in the capacitive coupling between sensor electrodes. In various embodiments, one or more input objects 140 near the sensor electrodes alters the electric field between the sensor electrodes, changing the measured capacitive coupling between the sensor electrodes. In one implementation, a transcapacitive sensing method operates by detecting the capacitive coupling from one or more transmitter sensor electrodes (also "transmitter electrodes"

or "transmitters") to one or more receiver sensor electrodes (also "receiver electrodes" or "receivers"). Sensor electrodes may be dedicated transmitters or receivers, or sensor electrodes may be configurable to either transmit or receive. Transmitter sensor electrodes may be modulated relative to a reference voltage (e.g., system ground) to transmit transmitter signals. Receiver sensor electrodes may be held substantially constant relative to the reference voltage to separate the transcapacitance measurement from the absolute capacitance measurement. A resulting signal may comprise effect(s) corresponding to one or more transmitter signals and/or to one or more sources of environmental interference (e.g., other electromagnetic signals).

In FIG. 1, a processing system 110 is shown as part of the input device 100. The processing system 110 configures and operates the hardware of the input device 100 to detect input objects 140 in the sensing region 120. The processing system 110 comprises parts of, or all of, one or more integrated circuits (ICs) and/or other circuitry components. For example, a processing system for a mutual capacitance sensor device may comprise receiver circuitry that can be configured to receive signals from receiver sensor electrodes and/or transmitter circuitry that can be configured to transmit signals with transmitter sensor electrodes. In some embodiments, the processing system 110 also comprises electronically-readable instructions, such as firmware code, software code, and/or the like. In some embodiments, firmware and/or software may configure the hardware to operate in different configurations.

In some embodiments, components comprising the processing system 110 are located together, such as near sensor electrodes of the input device 100. In other embodiments, components of processing system 110 are physically separate with one or more components close to sensor electrodes of input device 100 and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a mobile phone, and the processing system 110 may comprise circuits and firmware that are part of a main processor of the mobile phone. In some embodiments, the processing system 110 is dedicated to implementing the input device 100. In other embodiments, the processing system 110 also performs other functions, such as operating display screens, driving haptic actuators, driving LEDs, or sensing isometric joysticks, force sensors, or buttons, etc.

In some embodiments, the processing system 110 responds to input objects 140 (or changes in input objects 140) in the sensing region 120 directly by causing one or more actions. Example actions include changing operation modes, as well as GUI actions such as cursor movement, selection, menu navigation, scrolling, zooming, and other functions. In some embodiments, the processing system 110 provides information about the user input (or changes in user input) to some part of the electronic system (e.g., to a central processing system of the electronic system that may be separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensor electrodes of the input device 100 to produce electrical signals indicative of input objects 140 (or changes in input objects 140) in the sensing region 120. The processing system 110 may perform any appropriate amount of processing on the electrical signals in producing the information provided to the electronic system. For example, the processing system 110 may perform filtering or other signal conditioning. As another example, the processing system 110 may digitize analog electrical signals obtained from the sensor electrodes. As yet another example, the processing system 110 may subtract or otherwise account for a baseline, such that the information reflects a difference between the electrical signals and the baseline. As yet further examples, the processing system 110 may determine positional information, recognize inputs as gestures or commands, recognize handwriting, and the like.

"Positional information" as used herein broadly encompasses absolute position, relative position, movement, velocity, acceleration, and other types of spatial information. Exemplary "zero-dimensional" positional information includes near/far, contact/no contact information, force, or zero-dimensional gestures (e.g., taps and double-taps). Exemplary "one-dimensional" positional information includes positions along an axis, such as a scroll strip; or around a circle, such as a touch wheel. Exemplary "two-dimensional" positional information includes motions in a plane. Exemplary "three-dimensional" positional information includes instantaneous or average positions or velocities in space, such as hovers or swipes. Further examples include other representations of spatial information such as shape, rotation, or chiral motion. Historical (trend) data regarding one or more types of positional information may also be determined and/or stored, including, for example, historical data that tracks position, motion, or instantaneous velocity over time. In some embodiments, the trend data may be referred to as state information. The trend data may be used in calculations for de-jitter, to compute relative positions, and/or ballistics. In some embodiments, velocity may be used in gesture processing.

In some embodiments, the input device 100 is implemented with auxiliary input components that are operated by the processing system 110 or by some other processing system. These auxiliary input components may provide redundant functionality for user input in the sensing region 120 or some other functionality. FIG. 1 shows buttons 130 near the sensing region 120 that can be used to facilitate selection of items using the input device 100. Other types of auxiliary input components include sliders, balls, wheels, switches, force sensors, isometric joysticks, and the like. Conversely, in some embodiments, the input device 100 may be implemented with no other auxiliary input components.

In some embodiments, the input device 100 comprises a touch screen interface, and the sensing region 120 overlaps at least part of an active area of a display screen. For example, the input device 100 may comprise substantially transparent sensor electrodes overlaying the display screen and providing a touch screen interface for the associated electronic system. The display screen may be any type of dynamic display capable of displaying a visual interface to a user, and may include any type of light emitting diode (LED), organic LED (OLED), liquid crystal display (LCD), plasma, electroluminescence (EL), electronic ink (e-ink), or other display technology. The input device 100 and the display screen may share physical elements. For example, some embodiments may utilize some of the same electrical components for both displaying and sensing. As another example, the display screen may be operated in part or in total by the processing system 110.

In various embodiments, to reduce wiring, especially in large sensors, some capacitive implementations utilize arrays or other regular or irregular patterns of capacitive elements. In some capacitive implementations, separate sensing elements may be ohmically shorted together to form extended sensor electrodes, such as rows and columns. They may be shorted outside of the display area, or sensor elements may cross over other sensor elements. The crossover regions may be narrow, and may be made of a material with substantial electrical resistivity, such as the substantially transparent materials used in touch screens. Some capacitive implementations utilize resistive sheets, for example as shields or other common electrodes, which may be uniformly resistive. Therefore, capacitive sensors may have substantial series resistance and thus a substantial RC time constant.

Figure 2:
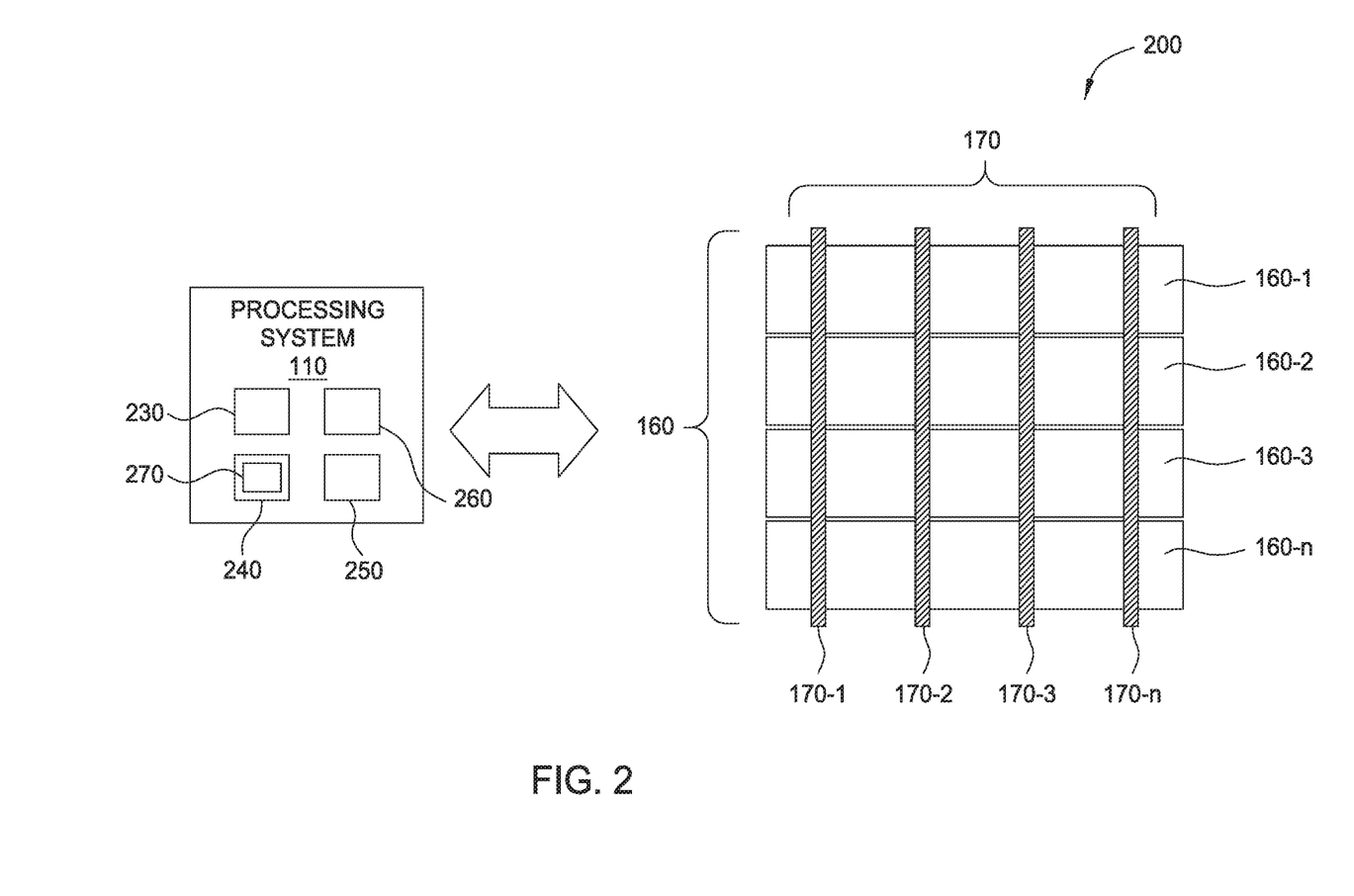
FIG. 2 is an example sensor electrode pattern for an input device according to an embodiment.

FIG. 2 illustrates an input device 200 including a processing system 110 and a portion of an example sensor electrode pattern configured to sense in a sensing region 120 associated with the pattern, according to some embodiments. For clarity of illustration and description, FIG. 2 shows a pattern of overlapping rectangles illustrating sensor electrodes, and does not show various details. This sensor electrode pattern comprises a first plurality of transmit electrodes 160 (160-1, 160-2, 160-3, . . . 160-n), and a second plurality of receive electrodes 170 (170-1, 170-2, 170-3, . . . 170-n) disposed over the plurality of transmit electrodes 160. The processing system 110 is coupled to receive electrodes 170 and transmit electrodes 160 through a plurality of conductive routing traces (not shown in FIG. 2).

Transmit electrodes 160 and receive electrodes 170 are typically ohmically isolated from each other. That is, one or more insulators separate transmit electrodes 160 and receive electrodes 170 and prevent them from electrically shorting to each other. In some embodiments, transmit electrodes 160 and receive electrodes 170 are separated by insulating material disposed between them at cross-over areas; in such constructions, the transmit electrodes 160 and/or receive electrodes 170 may be formed with jumpers connecting different portions of the same electrode. In some embodiments, transmit electrodes 160 and receive electrodes 170 are separated by one or more layers of insulating material. In some other embodiments, transmit electrodes 160 and receive electrodes 170 are separated by one or more substrates; for example, they may be disposed on opposite sides of the same substrate, or on different insulating substrates that are laminated together.

The areas of localized capacitive coupling between transmit electrodes 160 and receive electrodes 170 may be termed "capacitive pixels." The capacitive coupling between the transmit electrodes 160 and receive electrodes 170 changes with the proximity and motion of input objects 140 in the sensing region 120 associated with the transmit electrodes 160 and receive electrodes 170.

In some embodiments, the sensor pattern is "scanned" to determine these capacitive couplings. That is, the transmit electrodes 160 are driven to transmit transmitter signals. Transmitters may be operated such that one sensor electrode transmits at one time, or multiple sensor electrodes may transmit at the same time. Where multiple sensor electrodes transmit simultaneously, these multiple sensor electrodes may transmit the same transmitter signal to produce an effectively larger sensor electrode, or these multiple sensor electrodes may transmit different transmitter signals. For example, multiple sensor electrodes may transmit different transmitter signals according to one or more coding schemes or transforms that enable mathematical separation of the individual contributions to the resulting signals of receive electrodes 170.

The receive electrodes 170 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them may be used to derive information about changes in user input in the sensing region 120. For example, successive capacitive images acquired over successive periods of time can be used to track the motion(s) of one or more input objects 140 entering, exiting, and within the sensing region 120.

The background capacitance of a sensor device is the capacitive image obtained with no input object 140 in the sensing region 120. The background capacitance changes with the environment and operating conditions, and may be estimated in various ways. For example, some embodiments take "baseline images" when no input object 140 is determined to be in the sensing region 120, and use those baseline images as estimates of their background capacitances.

Capacitive images can be adjusted for the background capacitance of the sensor device to achieve more stable measurements. Some embodiments accomplish this by "baselining" measurements of the capacitive couplings at the capacitive pixels to produce a "baselined capacitive image." That is, some embodiments subtract from the measurements forming a capacitive image the appropriate corresponding "baseline values" of a "baseline image" associated with those pixels.

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In some embodiments where the two rates differ, successive capacitive images are acquired at different display updating states, and the different display updating states may affect the capacitive images that are acquired. That is, display updating affects, in particular, the background capacitive image. Thus, if a first capacitive image is acquired when the display updating is at a first state, and a second capacitive image is acquired when the display updating is at a second state, the first and second capacitive images may differ due to differences in the background capacitive image associated with the display updating states, and not due to changes in input objects 140 in the sensing region 120. This is more likely where the capacitive sensing and display updating electrodes are in close proximity to each other, or when they are shared (e.g., common electrodes that perform multiple functions, such as capacitive sensing functions and display functions).

For convenience of explanation, a capacitive image that is taken during a particular display updating state is considered to be of a particular frame type. That is, a particular frame type is associated with a mapping of a particular capacitive sensing sequence with a particular display sequence. Thus, a first capacitive image taken during a first display updating state is considered to be of a first frame type, a second capacitive image taken during a second display updating state is considered to be of a second frame type, a third capacitive image taken during a third display updating state is considered to be of a third frame type, and so on. Where the relationship of display update state and capacitive image acquisition is periodic, capacitive images acquired cycle through the frame types and then repeat. To avoid having too many frame types, the display and capacitive touch sensing may need to be synchronized.

The processing system 110 may be implemented with one or more ICs to control the various components in the input device. For example, the functions of the processing system 110 may be implemented in more than one integrated circuit that can control the display module elements (e.g., common electrodes) and drive transmitter signals and/or receive resulting signals received from the array of sensing elements. In embodiments where there is more than one IC of the processing system 110, communications between separate processing system ICs may be achieved through a synchronization mechanism, which sequences the signals provided to the transmit electrodes 160 and receive electrodes 170. Alternatively the synchronization mechanism may be internal to any one of the ICs.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

Processing system 110 may include a driver module 230, a sensor module 240, a determination module 250, and an optional memory 260.

The driver module 230, which includes driver circuitry, included in the processing system 110 may be configured for updating images on the display screen of a display device (not shown). For example, the driver circuitry may include display circuitry and/or sensor circuitry configured to apply one or more pixel voltages to the display pixel electrodes through pixel source drivers. The display and/or sensor circuitry may also be configured to apply one or more common drive voltages to the common electrodes while updating the display screen. In addition, the processing system 110 is configured to operate the common electrodes as transmitter electrodes for input sensing by driving transmitter signals onto the common electrodes.

The sensor module 240, which includes sensor circuitry, is coupled to the plurality of receive electrodes 170 and configured to receive resulting signals indicative of user input (or lack of user input) in the sensing region 120 and/or of environmental interference. The sensor module 240 may also be configured to pass the resulting signals to the determination module 250 for determining the presence of an input object and/or to the optional memory 260 for storage. Sensor module 240 may also drive sensor electrodes. In various embodiments, the IC of the processing system 110 may be coupled to drivers for driving the transmit electrodes 160. Alternatively, the drivers may be fabricated using thin-film-transistors (TFT) and may comprise switches, combinational logic, multiplexers, and other selection and control logic.

Sensor module 240 may also comprise a receiver 270 that interfaces receive electrodes 170 to other components. The receiver 270 may comprise an AFE (analog front end) in some embodiments, and will be referred to as AFE 270 in this example embodiment for convenience. Other receiver implementations may be used in other embodiments. The AFE 270 may be embodied in sensor module 240 or in one or more other components of processing system 110.

Embodiments described herein provide an anti-aliasing filter in an AFE 270 of a touch sensing device. The anti-aliasing filter can be a continuous time analog infinite impulse response filter. The anti-aliasing filter filters an input signal to remove high frequency interference and, in some embodiments, also low frequency interference. The filtered signal is then an input to a charge integrator, where the signal can be integrated over a period of time and then output for further processing. In some embodiments, filtering and integration occur sequentially and separately. In other embodiments, they may happen simultaneously or nearly simultaneously in a combined circuit. That is, filtering functions and integration functions may not be strictly separable by time or by circuit component. Circuit components that provide filtering functions may also assist with integration, and vice versa. Filtering, integration, and amplification may all be occurring at the same time in the circuit. Combining them is possible because they are linear time-invariant operations, as long as there is no sampling between them. In some embodiments described below, filtering and integration are described separately for convenience. However, from an implementation standpoint, in some cases filtering and integration may be combined within the same circuit block.

Figure 3:
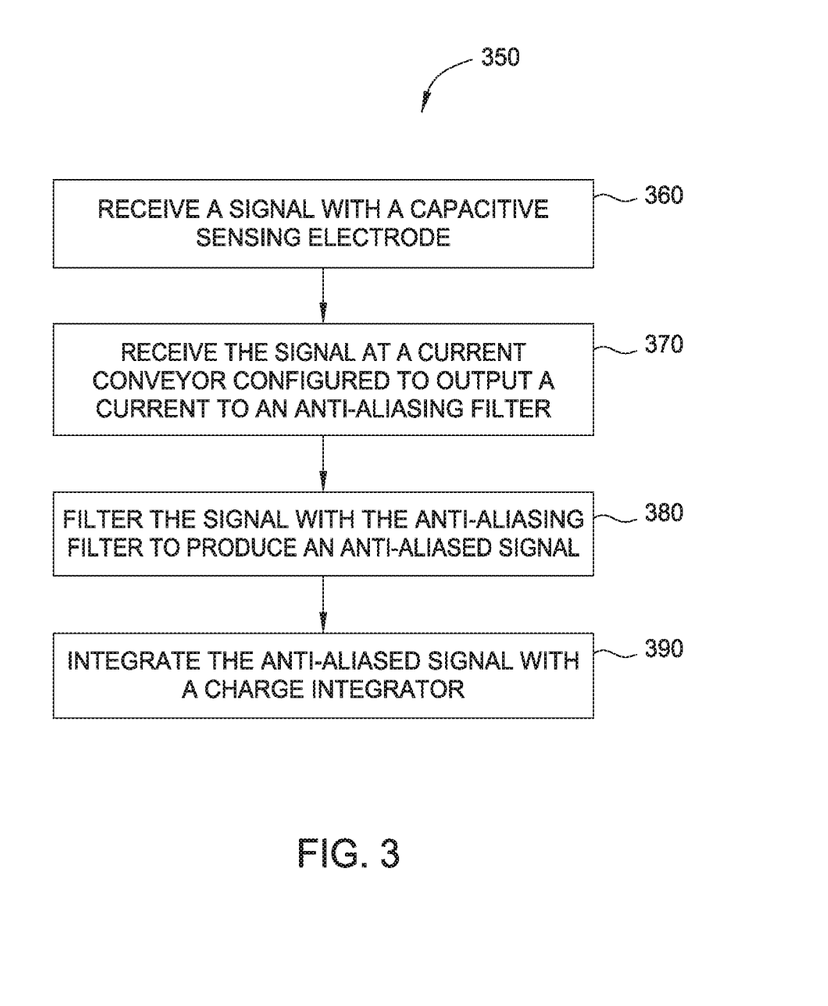
FIG. 3 is a signal flow diagram illustrating a method for filtering an input signal.

FIG. 3 is a signal flow diagram illustrating a method 350 for operating an input device. The method 350 provides a continuous time analog anti-alias filter added to an AFE 270 of a capacitive touch sensing device to improve the SIR. Although the method steps are described in conjunction with FIGS. 1-2 and 4-9, persons skilled in the art will understand that any system configured to perform the method steps, in any feasible order, falls within the scope of the present invention. In various embodiments, the hardware and/or software elements described in FIGS. 1-2 4, 6, and 8 can be configured to perform the method steps of FIG. 3. In some embodiments, the components illustrated in FIGS. 1-2, such as the sensor electrodes and AFE 270, may perform some or all of the steps in FIG. 3.

The method 350 begins at step 360, where a capacitive sensor electrode receives a signal. The signal could be, for example, a measure of a capacitance between a sensor electrode and input objects 140, or between sensor electrodes.

The method 350 continues to step 370, where a current conveyor or equivalent circuit receives the signal at a low-impedance input. The current conveyor is configured to output a current to an anti-aliasing filter at a high-impedance output, thus isolating the anti-aliasing filter from the load capacitance. The current conveyor may also provide current scaling, to allow smaller capacitance values in the anti-alias filter and charge integrator.

The method 350 proceeds to step 380, where the anti-aliasing filter filters the signal to produce an anti-aliased signal. In one embodiment, the anti-aliasing filter comprises an infinite impulse response continuous time analog filter. The signal is filtered before sampling of the signal occurs. The anti-aliasing filter can be a lowpass filter or a bandpass filter.

The method 350 proceeds to step 390, where a charge integrator integrates the filtered signal. The charge integrator could comprise an operational amplifier in some embodiments. In other embodiments, charge integration comprises a capacitance coupled to ground, driven by the high-impedance current output of the current conveyor.

Figure 4:
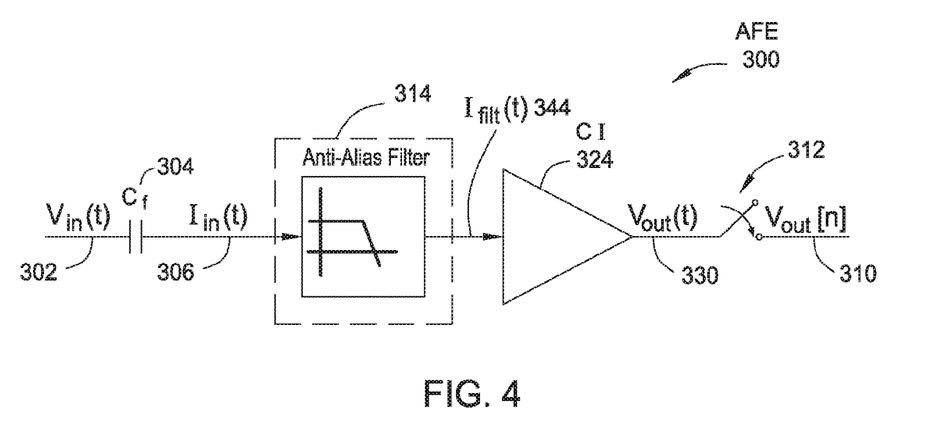
FIG. 4 illustrates a block diagram of an analog front end amplifier including an anti-alias filter.

FIG. 4 illustrates an example simplified system level block diagram of an AFE 300 with an anti-alias filter. The AFE 300 includes an anti-alias filter 314, a charge integrator CI 324, and a sampling circuit 312. In some embodiments, high frequency interference enters via the finger coupling capacitance $C_f$ 304, if a finger, or other input object 140, is present near a receive electrode 170. One or more input objects 140 in a sensing region 120 of touch sensor input device 100 have an interference voltage $V_{in}(t)$ 302. The interference voltage $V_{in}(t)$ 302 across the finger coupling capacitance $C_f$ 304 produces an interference current $I_{in}(t)$ 306. The interference current $I_{in}(t)$ 306 is received at the AFE 300. The interference current $I_{in}(t)$ 306 is then received as a current-mode signal by the anti-alias filter 314. The anti-alias filter 314 filters the current mode signal to remove high frequency interference in the signal. If the anti-alias filter 314 is implemented as a bandpass filter, low frequency interference (such as power supply noise) is rejected as well as high frequency interference. The anti-alias filter 314 outputs a filtered signal $I_{filt}(t)$ 344. The anti-alias filter 314 is illustrated as a block in FIG. 4. Detailed circuit diagrams for various embodiments of anti-alias filter 314 are described below.

After the signal is filtered by the anti-alias filter 314, the filtered signal $I_{filt}(t)$ 344 is transmitted to the charge integrator CI 324. In an embodiment, the charge integrator CI 324 is an active filter comprising an operational amplifier and associated passive components, such as capacitor(s), resistor(s), switch(es), and the like. The charge integrator CI 324 can be implemented using other types of inverting active filters that provide a low-impedance virtual-ground input, such as a leaky integrator, resetting integrator, inverting lowpass filter, or trans-impedance amplifier. The virtual ground can also be implemented using other types of circuits besides an operational amplifier that provide a low impedance input, such as a current pump, a current conveyor, a current mirror, a common-gate amplifier, or a large capacitor, in some cases. The charge integrator CI 324 outputs an output signal $V_{out}(t)$ 330. The sampling circuit 312 samples the output signal $V_{out}(t)$ 330 at regular intervals to produce discrete-time output signals $V_{out}[n]$ 310. The sampling circuit 312 can include switch(es), capacitor(s), and the like. Further processing of the signal can then be performed in discrete-time by other components of the input device 100.

Importantly, the anti-alias filter 314 filters the continuous time signal before sampling. Systems without an anti-alias filter before sampling are subject to harmonic susceptibility. Harmonic susceptibility means that the system is sensitive not only to its signal, frequency, but also to interference at alias frequencies, which are sums and differences of the signal frequency with integer multiples (harmonics) of the sampling frequency, as known to one of skill in the art.

Figure 5:
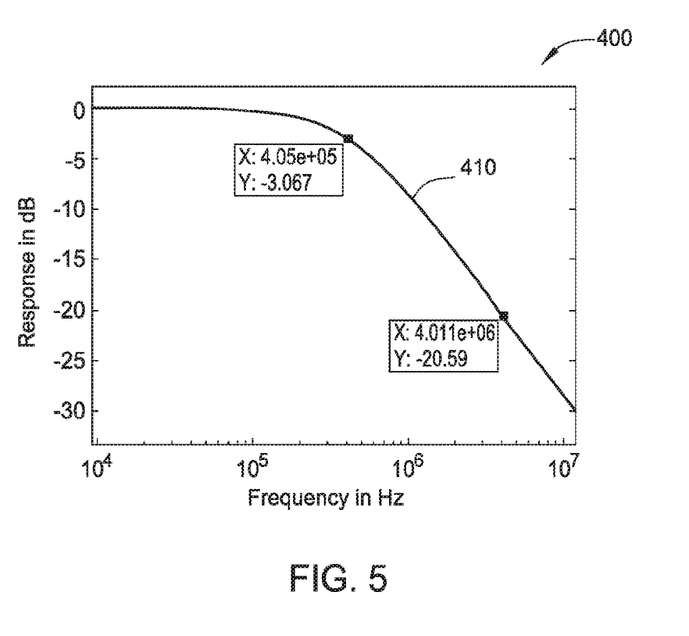
FIG. 5 illustrates a frequency response of a first-order anti-alias filter.

FIG. 5 illustrates the frequency response 400 of an example first-order lowpass anti-alias filter according to an embodiment. The y-axis is a scale of the response measured in decibels (dB). The x-axis is a logarithmic scale of the frequency measured in Hertz (cycles per second).

For this exemplary system, the anti-alias cutoff frequency is 400 KHz. As shown on the frequency response curve 410, the attenuation is approximately 3 dB at a frequency of 400 KHz. Therefore, the 3 dB cutoff frequency of the anti-alias filter is 400 KHz. Also illustrated on frequency response curve 410 is the response at a frequency of approximately 4 MHz, which is one decade above the cutoff frequency. At that point, the response is down by approximately 20.59 dB from its peak; in other words, the attenuation is approximately 20.59 dB. Therefore, the rolloff of this filter is approximately 20 dB/decade, which is the rolloff of a first-order filter.

In other embodiments, the anti-alias filter can have a different order other than first order. A second-order filter provides a rolloff of about 40 dB per decade. Higher order filters have a faster rolloff than lower order filters, but are generally more complicated to implement.

Figure 6:
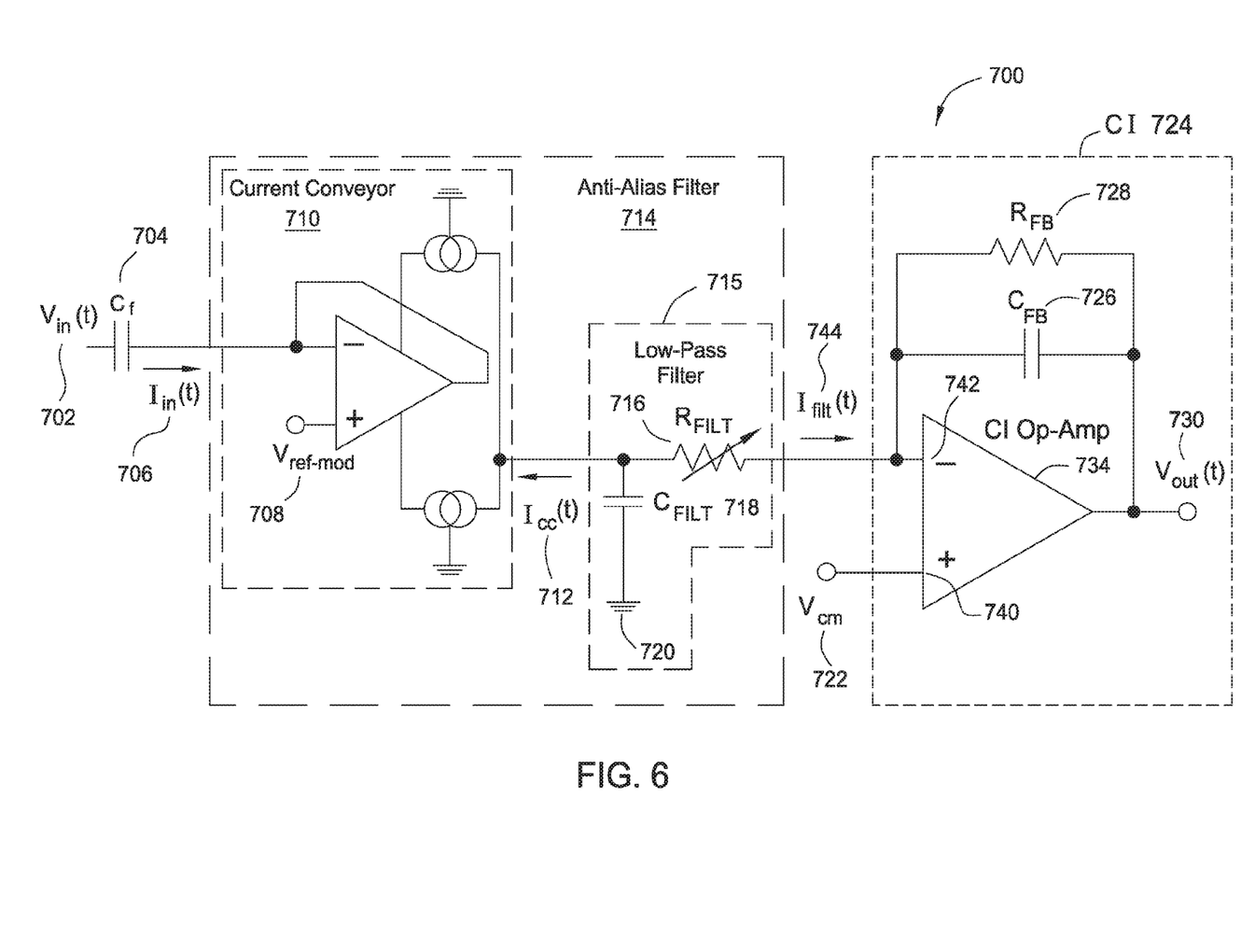
FIG. 6 illustrates a second order bandpass anti-alias filter and analog front end amplifier according to an embodiment.

FIG. 6 illustrates one example of an AFE 700 having a second-order bandpass anti-alias filter 714 according to an embodiment, comprising a first-order low-pass filter 715 and a first-order highpass. The first-order lowpass characteristic of the filter reduces harmonic susceptibility with a lowpass rolloff of about 20 dB/decade. In addition, the first-order highpass characteristic of the bandpass filter provides power supply noise rejection. The first-order highpass characteristic comes from the transfer function of the input capacitance $C_f$ 704 times the feedback resistance $R_{FB}$ 728.

AFE 700, at a high level, comprises a current conveyor 710 (or equivalent functionality) that receives an input current $I_{in}(t)$ 706 at a low impedance input; and at a high-impedance current output, outputs a scaled current $I_{cc}(t)$ 712 to other components of the anti-alias filter 714, such as low-pass filter 715. The low-pass filter 715 outputs a filtered current signal $I_{filt}(t)$ 744 to charge integrator (CI) 724, which outputs an output voltage $V_{out}(t)$ 730 for further processing.

The structure of the example embodiment of FIG. 6 is as follows. The input voltage $V_{in}(t)$ 702, comprising signal plus interference, is coupled to a first terminal of input capacitance $C_f$ 704. A second terminal of the input capacitance $C_f$ 704 is coupled to the input of anti-alias filter 714, which comprises a first input of current conveyor 710. A reference voltage $V_{ref\_mod}$ 708 is coupled to a second input terminal of current conveyor 710. Current conveyor 710 receives input current $I_{in}(t)$ 706 from input capacitance $C_f$ 704 at a low-impedance input, and outputs the scaled current $I_{cc}(t)$ 712 to low-pass filter 715 of anti-alias filter 714. In this example, low-pass filter 715 comprises a capacitance $C_{FILT}$ 718 and a resistance $R_{FILT}$ 716. A first terminal of capacitance $C_{FILT}$ 718 is also coupled to the scaled current output $I_{cc}(t)$ 712 of the current conveyor 710. A second terminal of the capacitance $C_{FILT}$ 718 is coupled to an AC ground 720. A first terminal of the resistance $R_{FILT}$ 716 is coupled to the first terminal of the capacitance $C_{FILT}$ 718. A second terminal of the resistance $R_{FILT}$ 716 is coupled to a filtered current signal $I_{filt}(t)$ 744 at a first input terminal of charge integrator CI 724.

The charge integrator 724 may comprise an operational amplifier (CI Op-Amp 734) in certain embodiments. The first input terminal 742 of CI op-amp 734 is coupled to the filtered current signal $I_{filt}(t)$ 744. The second input terminal 740 of CI op-amp 734 is coupled to a reference voltage $V_{cm}$ 722. The first input terminal 742 of CI op-amp 734 and the output terminal $V_{out}(t)$ 730 of CI op-amp 734 are coupled to a resistance $R_{FB}$ 728 in parallel with a capacitance $C_{FB}$ 726 as illustrated. Resistance $R_{FB}$ 728 can be a leak resistor or can represent the equivalent resistance of a switched capacitor or periodic reset. The output terminal 730 of CI op-amp 734 produces an output voltage $V_{out}(t)$.

In embodiments described herein, the input to the anti-alias filter 714 is a current input $I_{cc}(t)$ 712. The input capacitance $C_f$ 704 represents a finger capacitance $C_f$, and an input voltage $V_{in}(t)$ 702 across the input capacitance $C_f$ 704 produces an input current $I_{in}(t)$ 706. A current conveyor 710 provides a low-impedance input that holds one end of input capacitance $C_f$ 704 at a virtual ground potential, so that the input current $I_{in}(t)$ 706 is only the product of input voltage $V_{in}(t)$ 702 times input capacitance $C_f$ 704, and nothing else, thus making it independent of extraneous capacitances such as the background capacitance. The current conveyor 710 provides a high-impedance current output $I_{cc}(t)$ 712 to the low-pass filter 715, thus isolating the anti-alias filter 714 from the load capacitance. This makes the anti-alias filter 714 independent of the load, and allows it to have a higher Q. The current conveyor 710 may also provide current scaling, to allow more reasonable capacitance values in the anti-alias filter 714 and charge integrator 724. Thus, current conveyors 710 that perform current scaling are sometimes also called active current dividers or current amplifiers. Other components that fulfill much the same function may be used, such as a current mirror, a current pump, a common-gate amplifier, or a trans-resistance amplifier followed by a resistor.

In operation, an input voltage $V_{in}(t)$ 702 comprising an input signal plus interference from a touch sensing device is received at a first terminal of input capacitance $C_f$ 704. A second terminal of input capacitance $C_f$ 704 is coupled to a low-impedance input of current conveyor 710 (or equivalent functionality) which holds the voltage substantially constant, thus providing a virtual ground, so that input current $I_{in}(t)$ 706 represents substantially only the product of the input capacitance $C_f$ 704 times the input voltage $V_{in}(t)$ 702. Thus the LaPlace transfer function of the input capacitance is simply:

$$I_{in}(s) = sC_f V_{in}(s)$$

Current conveyor 710 receives input current $I_{in}(t)$ 706 and outputs current $I_{cc}(t)$ 712. Furthermore, the output current $I_{cc}(t)$ 712 may be scaled down, so that capacitance values may be made smaller. The transfer function of current conveyor 710, with current gain of $A_I$, is:

$$I_{CC}(s) = A_I I_{in}(s)$$

The current output $I_{cc}(t)$ 712 from current conveyor 710 is passed to low-pass filter 715. In this exemplary embodiment, low-pass filter 715 comprises a resistance $R_{FILT}$ 716 and a capacitance $C_{FILT}$ 718 coupled to AC ground 720 as shown. The transfer function of low-pass filter 715 is:

$$\frac{1}{(1 + sR_{FILT}C_{FILT})}$$

The charge integrator transfer function is:

$$\frac{R_{FB}}{(1 + sR_{FB}C_{FB})}$$

Due to the isolation provided by the virtual grounds at the low-impedance first input of the current conveyor 710 and at the first input of the charge integrator 724, the parts function independently and do not interact. Therefore, the transfer functions can be written separately, and the overall transfer function is merely the product of the parts. In factored form, the LaPlace transfer function of AFE 700 is:

$$\frac{Vout}{Vin}(s) = \frac{sC_f A_I R_{FB}}{(1 + sR_{FB}C_{FB})(1 + sR_{FILT}C_{FILT})}$$

Note that regardless of component values, this formula always produces two real poles and no complex poles; i.e., it cannot produce a Q greater than 0.5. This form of transfer function can also be implemented by other circuits, such as a Multiple Feedback (MFB) inverting active filter. Any circuit that implements the same transfer function will suffice.

Example circuit component values for one embodiment include a current conveyor current gain $A_I$ of ⅛, $R_{FILT}$=285 kΩ, $R_{FB}$=550 kΩ, $C_{FILT}$=2 pF, and $C_{FB}$=4 pF. Those exemplary values produce a 3 dB cutoff frequency of 400 KHz. Other circuit component values may be used in other embodiments. In one exemplary embodiment, resistance $R_{FILT}$ 716 is a variable resistance so that the corner frequency of the anti-alias filter is adjustable. The variable resistance also allows for compensation of uncontrolled variation in capacitance $C_{FILT}$ 718. In other embodiments, resistance $R_{FILT}$ 716 is not a variable resistance.

Anti-alias filter 714 filters the input signal to produce a current $I_{filt}(t)$ 744. Because anti-alias filter 714 comprises a low-pass filter 715, high frequencies are filtered out. Low frequencies are filtered out by the highpass characteristic of input capacitance $C_f$ 704 times feedback resistance $R_{FB}$ 728.

Figure 7:
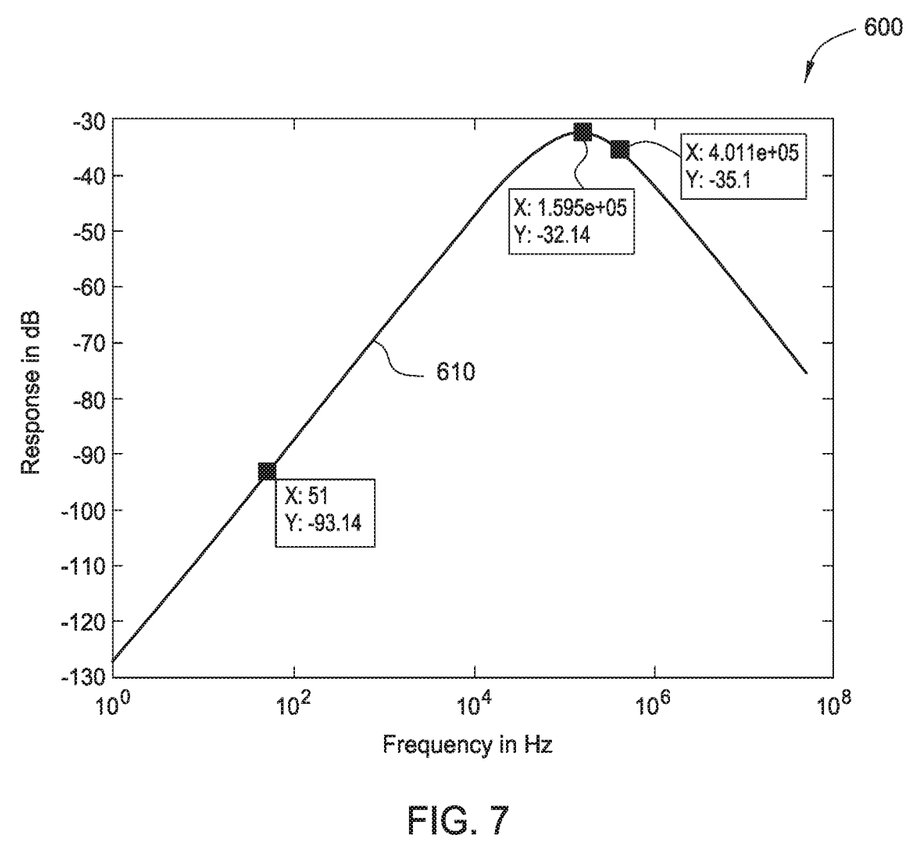
FIG. 7 illustrates a frequency response of a second-order bandpass filter.

FIG. 7 illustrates the frequency response of the transfer function above. The exemplary analog component values described above with respect to FIG. 6 were used to produce graph 600, with the addition of $C_f$=1 pF. The 3 dB cutoff frequency for this example filter is 400 KHz.

Curve 610 illustrates the bandpass characteristics of the transfer function. The y-axis is a scale of the response measured in dB. The x-axis is a scale of the frequency measured in Hz. At a frequency of 51 Hz, the response is approximately −93 dB. At a frequency of approximately 160 KHz, the response peak is −32 dB. At a frequency of 400 KHz, the response is −35 dB, which is 3 dB below the peak response. Thus, the 3 dB cutoff frequency is 400 KHz.

Figure 8:
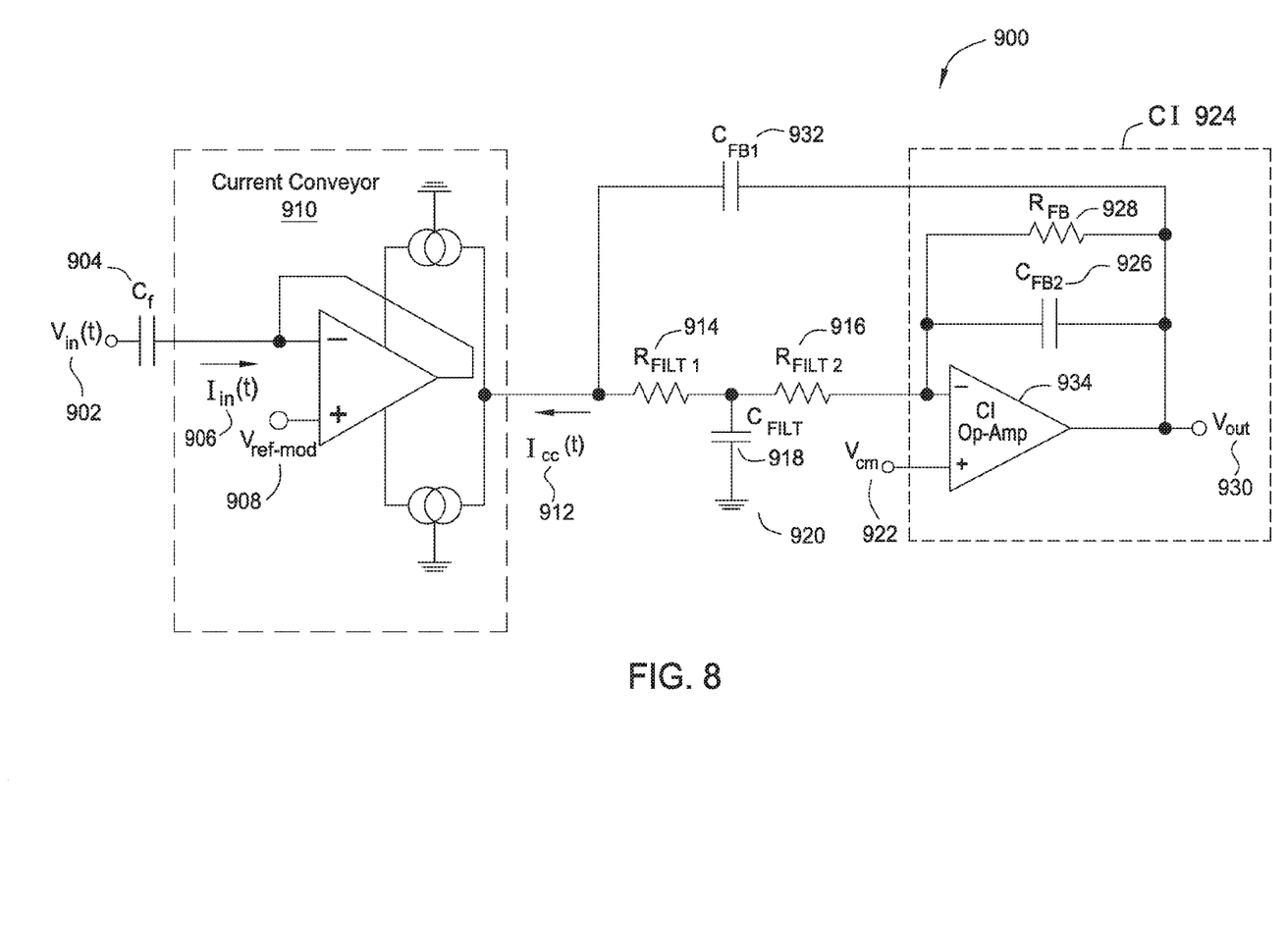
FIG. 8 illustrates a third-order bandpass anti-alias filter and analog front end amplifier according to an embodiment.

FIG. 8 illustrates an exemplary embodiment of a 3rd order bandpass anti-alias filter and analog front end amplifier. The 3rd order bandpass filter comprises a 2nd order lowpass filter combined with a 1st order highpass characteristic. The anti-alias filter illustrated in AFE 900 has a 40 dB/decade lowpass rolloff. At a high level, AFE 900 comprises a current conveyor 910 that receives an input current $I_{in}(t)$ 906 at a low-impedance input providing a virtual ground, and outputs a current $I_{cc}(t)$ 912 to a multiple-feedback (MFB) active-filter which acts as both an anti-alias filter and a charge integrator. The resistance and capacitance components in AFE 900 to the right of the current conveyor 910 ($R_{FILT1}$ 914, $C_{FILT}$ 918, $R_{FILT2}$ 916, $C_{FB1}$ 932, $R_{FB}$ 928, $C_{FB2}$ 926, $V_{cm}$ 922, and CI op-amp 934) work together to provide the filtering and integration of the signal to produce an output signal $V_{out}$ 930. In this example circuit, the components that provide the anti-aliasing filtering are not as distinct and separate from the components that provide charge integration as they are in AFE 700 illustrated in FIG. 6. For example, $C_{FB1}$ 932 is a component that operates to provide both filtering and charge integration. However, CI 924 (comprising $R_{FB}$ 928, $C_{FB2}$ 926, and CI op-amp 934) is illustrated to show the main components of charge integration. Feedback resistance $R_{FB}$ 928 times input capacitance $C_f$ 904 produces a third-order bandpass characteristic.

The structure of the example embodiment of FIG. 8 is as follows. An input capacitance $C_f$ 904 is coupled to an input voltage $V_{in}(t)$ 902. The capacitance $C_f$ 904 is also coupled to a first input terminal of current conveyor 910. A reference voltage $V_{ref\_mod}$ 908 is coupled to a second input terminal of current conveyor 910. Input current $I_{in}(t)$ 906 enters the current conveyor 910 at the low-impedance first input. Current conveyor 910 outputs a scaled current $I_{cc}(t)$ 912. The current output $I_{cc}(t)$ 912 of current conveyor 910 is coupled to a first terminal of resistance $R_{FILT1}$ 914. The second terminal of resistance $R_{FILT1}$ 914 is coupled to a first terminal of resistance $R_{FILT2}$ 916 and a first terminal of capacitance $C_{FILT}$ 918. The second terminal of capacitance $C_{FILT}$ 918 is coupled to an AC ground 920. The second terminal of resistance $R_{FILT2}$ 916 is coupled to a first input terminal of CI op-amp 934.

The current output $I_{cc}(t)$ 912 of current conveyor 910 is also coupled to a first terminal of $C_{FB1}$ 932 (first feedback capacitance). The second terminal of $C_{FB1}$ 932 is coupled to the output terminal of CI op-amp 934, $V_{out}$ 930. Coupled between the first input terminal of CI op-amp 934 and the output terminal of CI op-amp 934, $V_{out}$ 930, are resistance $R_{FB}$ 928 and capacitance $C_{FB2}$ 926 in parallel (feedback resistance and second feedback capacitance, respectively). Coupled to the second input terminal of CI op-amp 934 is a reference voltage $V_{cm}$ 922.

In operation, AFE 900 receives an input voltage $V_{in}(t)$ 902 comprising a signal plus interference voltage from a touch sensor device at a first terminal of input capacitance $C_f$ 904. A second terminal of input capacitance $C_f$ 904 is coupled to the low-impedance first input of the current conveyor 910. The current output $I_{cc}(t)$ 912 from current conveyor 910 is passed to resistance $R_{FILT1}$ 914, one of the components that operates to filter the signal. $R_{FILT1}$ 914, $C_{FILT}$ 918 (coupled to AC ground 920), $R_{FILT2}$ 916, $C_{FB1}$ 932, $R_{FB}$ 928, and $C_{FB2}$ 926 work together with CI op-amp 934 to provide the filtering and integration of the input signal to produce a filtered output signal $V_{out}$ 930. Input capacitance $C_f$ 904 and resistance $R_{FB}$ 928 provide the highpass characteristic for AFE 900.

In factored form, the LaPlace transfer function of AFE 900 is:

$$\frac{Vout}{Vin}(s) = \frac{sC_f A_I R_{FB}}{((1 + sR_{FILT1}C_{FB1})(1 + sR_{FILT2}C_{FILT}) + sR_{FILT2}C_{FB1})} \\ (1 + sR_{FB}C_{FB2}) + sR_{FB}C_{FB1}$$

Note that $R_{FILT1}$ 914 and $C_{FILT}$ 918 are not essential components. Either or both can be zero and still get a second-order transfer function that still performs anti-aliasing.

Figure 9:
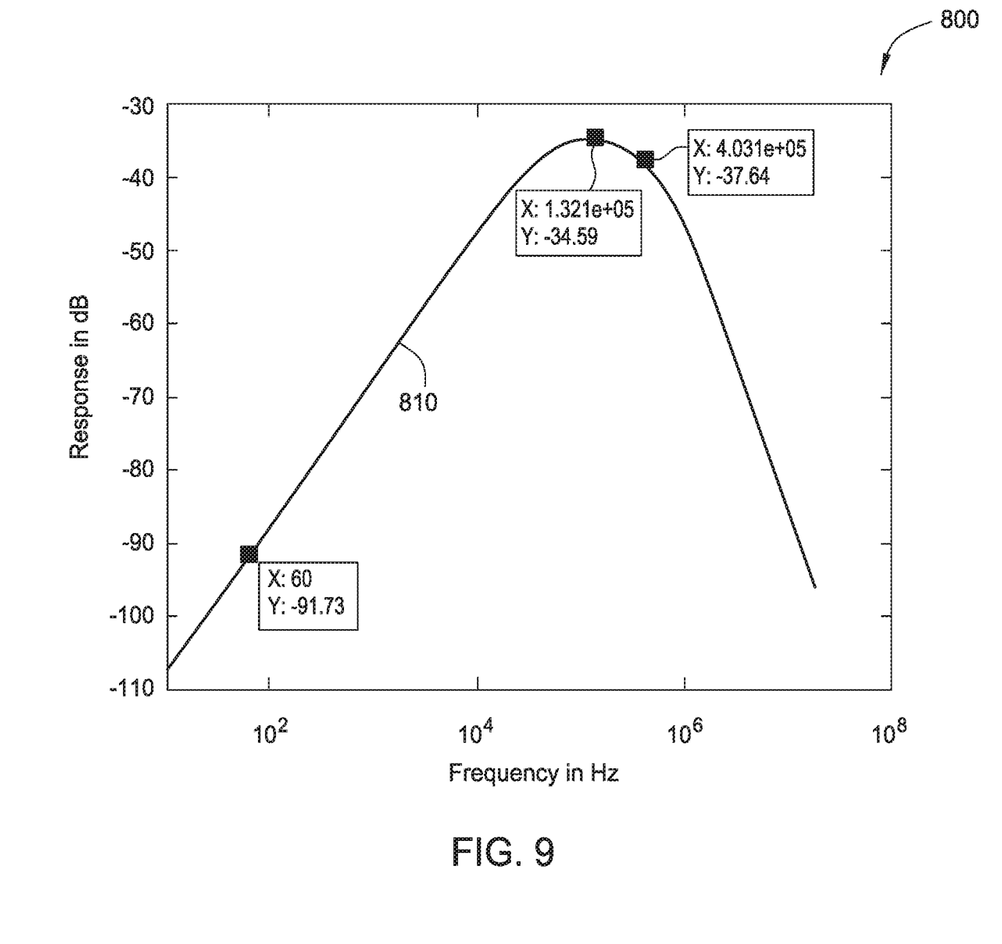
FIG. 9 illustrates a frequency response of a third order bandpass filter.

FIG. 9 illustrates the frequency response 800 of a third order bandpass filter as illustrated above in FIG. 8. Exemplary analog component values used to produce graph 800 are as follows: $A_I$=⅛, $C_f$=1 pF, $C_{FILT}$=2 pF, $C_{FB1}$=2 pF, $C_{FB2}$=2 pF, $R_{FILT1}$=200 kΩ, $R_{FILT2}$=310 kΩ, and $R_{FB}$=550 kΩ.

Curve 810 illustrates the bandpass characteristics of the anti-alias filter. The y-axis is a scale of the response measured in dB. The x-axis is a scale of the frequency measured in Hz. At a frequency of 60 Hz, the response is approximately −92 dB. At a frequency of approximately 132 KHz, the peak response is −34.5 dB. At a frequency of approximately 400 KHz, the response is −37.5 dB, which is 3 dB below the peak response. Thus, the 3 dB cutoff frequency is around 400 KHz.

The lowpass rolloff of curve 810 in FIG. 9 can be visually compared to the lowpass rolloff of curve 610 in FIG. 7 to see that the rolloff in FIG. 9 is steeper than that of FIG. 7. This is because, as described above, the lowpass rolloff of the 2nd order bandpass filter of FIGS. 6 and 7 is 20 dB/decade, while the lowpass rolloff of the 3rd order bandpass filter of FIGS. 8 and 9 is 40 dB/decade. Therefore, a tradeoff can be made between a simpler circuit or greater filtering performance. Note that to maintain the steeper rolloff rate at high frequencies, the output $V_{out}$ 930 of CI op-amp 934 must have a low impedance at high frequencies, i.e., $V_{out}(t)$ serves as an AC ground at high frequencies.

Thus, the embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

What is claimed is:

1. A method for sensing an input device, comprising:
   receiving a signal with a capacitive sensor electrode;
   forwarding the signal to a low-impedance input of a current conveyor configured to provide a virtual ground at the low-impedance input;
   outputting a current to an anti-aliasing filter;
   filtering the current with the anti-aliasing filter to produce an anti-aliased signal, the anti-aliasing filter having an output and comprising a continuous time analog infinite impulse response filter; and
   integrating the anti-aliased signal with a charge integrator having an input, wherein the output of the anti-aliasing filter is directly connected to the input of the charge integrator.

2. The method of claim 1, wherein the charge integrator further comprises:
   an operational amplifier, the operational amplifier further comprising an input terminal and an output terminal; and
   a feedback capacitance coupled to the input terminal and the output terminal of the operational amplifier.

3. The method of claim 1, wherein the anti-aliasing filter further comprises:
   a current-mode filter, the current-mode filter further comprising:
      at least one capacitance to at least one AC ground, the at least one capacitance driven by the output of the current conveyor; and
      at least one resistance coupling the at least one capacitance to an input of the charge integrator.

4. The method of claim 1, wherein filtering the current comprises:
   filtering out interference from the current at frequencies higher than a signal frequency.

5. The method of claim 1, wherein filtering the current comprises:
   filtering out interference from the current at frequencies higher than a signal frequency and at frequencies lower than the signal frequency.

6. The method of claim 1, wherein the anti-aliasing filter comprises:
a second-order bandpass filter.

7. The method of claim 1, wherein the anti-aliasing filter comprises:
a third-order bandpass filter.

8. An input device, comprising:
a plurality of capacitive sensor electrodes configured to receive a signal; and
a processing system coupled to the plurality of capacitive sensor electrodes, the processing system comprising an analog front end, the analog front end comprising:
a current conveyor having a low-impedance input configured to receive the signal forwarded by at least one of the plurality of capacitive sensor electrodes, to provide a virtual ground at the low-impedance input, and to output a current;
an anti-aliasing filter having an input and an output, the input of the anti-aliasing filter configured to receive the current from the output of the current conveyor, the anti-aliasing filter comprising a continuous time analog infinite impulse response filter configured to filter out interference from the current at frequencies higher than a signal frequency of the processing system to produce an anti-aliased signal; and
a charge integrator having an input and configured to integrate the anti-aliased signal and, wherein the output of the anti-aliasing filter is directly connected to the input of the charge integrator.

9. The input device of claim 8, wherein the charge integrator further comprises:
an operational amplifier and a feedback capacitance, the operational amplifier including an input terminal and an output terminal, wherein the feedback capacitance is coupled to the input terminal and the output terminal of the operational amplifier.

10. The input device of claim 9, wherein the anti-aliasing filter further comprises:
at least one capacitance to at least one AC ground, the at least one capacitance driven by the output of the current conveyor; and
a resistance coupled to a first input terminal of the operational amplifier, the resistance coupling the first input terminal to the at least one capacitance.

11. The input device of claim 8, wherein the anti-aliasing filter comprises:
a second-order bandpass filter further configured to filter out interference from the current at frequencies lower than the signal frequency.

12. The input device of claim 8, wherein the anti-aliasing filter further comprises:
a third-order bandpass filter.

13. A processing system for filtering a received signal from a capacitive touch sensor device, the processing system comprising:
a current conveyor having a low-impedance input configured to receive the received signal forwarded by the capacitive touch sensor device, to provide a virtual ground at the low-impedance input, and to output a current;
an anti-aliasing filter having an input and an output, the input of the anti-aliasing filter configured to receive the current from the output of the current conveyor, and comprising a continuous time infinite impulse response filter configured to filter out interference from the current at frequencies higher than a signal frequency of the processing system to produce an anti-aliased signal; and
a charge integrator having an input and configured to integrate the anti-aliased signal, wherein the output of the anti-aliasing filter is directly connected to the input of the charge integrator.

14. The processing system of claim 13, wherein the charge integrator comprises an operational amplifier and a feedback capacitance, the operational amplifier comprising an input terminal and an output terminal, wherein the feedback capacitance couples the input terminal and the output terminal of the operational amplifier.

15. The processing system of claim 13, wherein the anti-aliasing filter further comprises:
a resistance coupled to a first input terminal of the charge integrator; and
a capacitance coupled to a second input terminal of the resistance.

16. The processing system of claim 13, wherein the anti-aliasing filter comprises:
a second-order bandpass filter further configured to filter out interference from the current at frequencies lower than the signal frequency.

17. The processing system of claim 13, wherein the anti-aliasing filter further comprises:
a third-order bandpass filter.

* * * * *